(12) United States Patent
Kim et al.

(10) Patent No.: US 7,643,387 B2
(45) Date of Patent: *Jan. 5, 2010

(54) HIGH-DENSITY READ-ONLY OPTICAL DISC, AND OPTICAL DISC APPARATUS AND METHOD USING THE SAME

(75) Inventors: Jin Yong Kim, Kyunggi-do (KR); Sang Woon Suh, Seoul (KR); Kyung Chan Park, Seoul (KR); Yun Sup Shin, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/986,019

(22) Filed: Nov. 12, 2004

(65) Prior Publication Data
US 2005/0063261 A1    Mar. 24, 2005

Related U.S. Application Data

(62) Division of application No. 10/426,020, filed on Apr. 30, 2003.

(30) Foreign Application Priority Data

| May 1, 2002 | (KR) | 10-2002-0023983 |
| Sep. 10, 2002 | (KR) | 10-2002-0054705 |
| Dec. 6, 2002 | (KR) | 10-2002-0077358 |

(51) Int. Cl.
*G11B 7/00*    (2006.01)
(52) U.S. Cl. ............. 369/44.26; 369/44.29; 369/44.13; 369/53.21; 369/53.28
(58) Field of Classification Search ............ 369/44.26, 369/44.29, 53.21, 44.13, 53.28
See application file for complete search history.

(56) References Cited

U.S. PATENT DOCUMENTS 4,748,609 A * 5/1988 Yonezawa et al. ........ 369/44.13

(Continued)

FOREIGN PATENT DOCUMENTS

CN         1313599         9/2001

(Continued)

OTHER PUBLICATIONS

Machine Translation of Japanese Publication No. 1022287 by Shimizu Akihiko in Aug. 21, 1998.*

(Continued)

*Primary Examiner*—Wayne R Young
*Assistant Examiner*—Linh T Nguyen
(74) *Attorney, Agent, or Firm*—Harness, Dickey & Pierce

(57) ABSTRACT

A high-density read-only optical disc, and an optical disc apparatus and method using the same. The apparatus and method record data on a lead-in area of a high-density read-only optical disc such as a BD-ROM (Blu-ray disc ROM (Read Only Memory)) in the form of pre-pit strings associated with an HFM (High-Frequency Modulated) groove applied to a BD-RW (Blu-ray Disc Rewritable). Moreover, the apparatus and method continuously apply the same tracking servo operation to an entire area of the same high-density read-only optical disc or rewritable optical disc. Therefore, the apparatus and method can simplify an algorithm for controlling a plurality of tracking servo operations, and avoid an increased size of the optical disc apparatus.

25 Claims, 12 Drawing Sheets

U.S. PATENT DOCUMENTS

| | | | | |
|---|---|---|---|---|
| 4,907,216 | A | * | 3/1990 | Rijnsburger .............. 369/44.39 |
| 5,051,998 | A | | 9/1991 | Murai et al. |
| 5,513,260 | A | | 4/1996 | Ryan |
| 5,538,773 | A | | 7/1996 | Kondo |
| 5,572,507 | A | * | 11/1996 | Ozaki et al. .............. 369/53.21 |
| 5,706,047 | A | | 1/1998 | Lentz et al. |
| 5,706,268 | A | | 1/1998 | Horimai |
| 5,724,327 | A | | 3/1998 | Timmermans et al. |
| 5,737,286 | A | | 4/1998 | Timmermans et al. |
| 5,936,933 | A | | 8/1999 | Miyamoto et al. |
| 5,940,364 | A | | 8/1999 | Ogata et al. |
| 6,014,348 | A | | 1/2000 | Kim |
| 6,070,799 | A | | 6/2000 | Ashe |
| 6,081,785 | A | | 6/2000 | Oshima et al. |
| 6,128,272 | A | * | 10/2000 | Horimai et al. .......... 369/44.26 |
| 6,144,625 | A | | 11/2000 | Kuroda et al. |
| 6,266,299 | B1 | | 7/2001 | Oshima et al. |
| 6,353,890 | B1 | | 3/2002 | Newman |
| 6,532,206 | B2 | | 3/2003 | Muramatsu et al. |
| 6,535,477 | B1 | | 3/2003 | Muramatsu et al. |
| 6,546,490 | B2 | | 4/2003 | Sako et al. |
| 6,549,498 | B1 | | 4/2003 | Inoue et al. |
| 6,580,678 | B2 | | 6/2003 | Kondo et al. |
| 6,603,720 | B1 | * | 8/2003 | Kuroda et al. ............. 369/53.23 |
| 6,603,732 | B2 | * | 8/2003 | Tosaki et al. ............. 369/275.3 |
| 6,608,804 | B2 | | 8/2003 | Shim |
| 6,671,249 | B2 | | 12/2003 | Horie ...................... 369/225.3 |
| 6,683,844 | B2 | | 1/2004 | Kuorda |
| 6,694,023 | B1 | | 2/2004 | Kim |
| 6,707,774 | B1 | | 3/2004 | Kuroda et al. |
| 6,707,785 | B1 | | 3/2004 | Kato |
| 6,930,977 | B1 | | 8/2005 | Kondo et al. |
| 7,012,859 | B2 | * | 3/2006 | Park ........................ 369/44.25 |
| 7,014,815 | B1 | | 3/2006 | Worthington et al. |
| 7,028,011 | B1 | | 4/2006 | Ha et al. |
| 7,035,172 | B1 | | 4/2006 | Murata |
| 7,050,383 | B2 | | 5/2006 | Nakajima et al. |
| 7,061,850 | B1 | | 6/2006 | Irie et al. |
| 7,092,335 | B2 | | 8/2006 | Horie ........................ 369/53.2 |
| 7,215,610 | B2 | | 5/2007 | Sako et al. |
| 7,280,461 | B2 | | 10/2007 | Endoh |
| 7,302,588 | B2 | | 11/2007 | Sako et al. |
| 2001/0007545 | A1 | | 7/2001 | Ueda et al. |
| 2001/0014077 | A1 | * | 8/2001 | Muramatsu et al. ...... 369/275.3 |
| 2001/0038603 | A1 | | 11/2001 | Kondo et al. |
| 2002/0001274 | A1 | | 1/2002 | Nakajima et al. |
| 2002/0021635 | A1 | | 2/2002 | Park et al. |
| 2002/0024898 | A1 | * | 2/2002 | Kamiyama .............. 369/44.28 |
| 2002/0024914 | A1 | * | 2/2002 | Kobayashi ............. 369/109.01 |
| 2002/0027855 | A1 | | 3/2002 | Shishido et al. |
| 2002/0110067 | A1 | | 8/2002 | Kondo et al. |
| 2003/0002427 | A1 | | 1/2003 | Lee et al. |
| 2003/0002430 | A1 | | 1/2003 | Kim et al. |
| 2003/0012098 | A1 | | 1/2003 | Sako et al. |
| 2003/0048705 | A1 | * | 3/2003 | Wang et al. .............. 369/44.26 |
| 2003/0067849 | A1 | * | 4/2003 | Mikami .................... 369/44.25 |
| 2003/0112736 | A1 | | 6/2003 | Muramatsu et al. |
| 2005/0111315 | A1 | | 5/2005 | Hwang et al. |
| 2005/0213483 | A1 | | 9/2005 | Tomita et al. |

FOREIGN PATENT DOCUMENTS

| | | | |
|---|---|---|---|
| CN | | 1384491 | 12/2002 |
| EP | | 0 299 573 | 7/1988 |
| EP | | 0 545 472 | 11/1992 |
| EP | | 0 936 610 A2 | 8/1999 |
| EP | | 1 168 312 | 9/2000 |
| EP | | 1 065 659 | 1/2001 |
| EP | | 1081688 | 3/2001 |
| EP | | 1 189 213 | 3/2002 |
| EP | | 1 126 446 | 11/2007 |
| JP | | 04-274032 | 9/1992 |
| JP | | 08-036803 | 2/1996 |
| JP | | 8-087760 | 4/1996 |
| JP | | 09-305396 | 11/1997 |
| JP | | 10-172149 | 6/1998 |
| JP | | 10-177767 | 6/1998 |
| JP | | 10302381 A | * 11/1998 |
| JP | | 10-326419 | 12/1998 |
| JP | | 11-032328 | 2/1999 |
| JP | | 11-339268 | 12/1999 |
| JP | | 2000-076141 | 3/2000 |
| JP | | 2000-113466 | 4/2000 |
| JP | | 2000-123479 | 4/2000 |
| JP | | 2000-149414 | 5/2000 |
| JP | | 2000-231722 | 8/2000 |
| JP | | 2001-014796 | 1/2001 |
| JP | | 2001-135021 | 5/2001 |
| JP | | 2001-189015 | 7/2001 |
| JP | | 2001-216727 | 8/2001 |
| JP | | 2001-229547 | 8/2001 |
| JP | | 2001-256655 | 9/2001 |
| JP | | 2001-325747 | 11/2001 |
| JP | | 2001-332031 | 11/2001 |
| JP | | 2002-132457 | 5/2002 |
| JP | | 2002-182770 | 6/2002 |
| JP | | 2002-319245 | 10/2002 |
| JP | | 2005-266593 | 9/2005 |
| JP | | 2006-337763 | 12/2006 |
| KR | | 10-1999-0079395 | 11/1999 |
| KR | | 10-0239468 | 1/2000 |
| KR | | 10-2001-0085952 | 9/2001 |
| KR | | 10-2001-0088053 | 9/2001 |
| KR | | 10-2003-0004542 | 1/2003 |
| KR | | 10-2003-0030506 | 4/2003 |
| WO | | WO 00/45381 | 8/2000 |
| WO | | WO 01/11890 | 2/2001 |
| WO | | WO 01/88917 | 11/2001 |
| WO | | WO 01/95327 | 12/2001 |
| WO | | WO 02/01560 | 1/2002 |
| WO | | WO 02/37492 | 5/2002 |
| WO | | WO 03/094158 | 11/2003 |

OTHER PUBLICATIONS

Article, Understanding the Design of the DVD+Rw and DVD+R Disc Format, 2008 (as printed out).*
Article, Addressing Schemes for Optical Discs, 2008 (as printed out).*
Search Report (Aug. 19, 2003) for PCT/KR03/00867.
Office Action (dated Mar. 17, 2006) for Chinese Application No. 03809910.1.
Communication (dated circa Nov. 2006) for Japanese Application No. 2004-502291.
Japanese Patent Office Action (dated May 29, 2007), for corresponding Japanese Patent Application No. 2004-502291.
Office Action for U.S. Appl. No. 10/989,292, filed Dec. 31, 2008.
Office Action for corresponding Korean patent application No. 10-2002-0037947 dated Sep. 17, 2008.
Office Action for corresponding Japanese patent application No. 2005-214336 dated Sep. 24, 2008.
Office Action for related U.S. Appl. No. 10/426,020, filed Jan. 28, 2009.
Office Action for related U.S. Appl. No. 11/976,387, filed Feb. 6, 2009.
Office Action for Japanese patent application No. 2005-214336 dated Mar. 10, 2009.
Office Action for International Patent Application No. PCT/KR03/01292 dated Oct. 23, 2003.
Search Report for International Patent Application No. PCT/KR2004/000338 dated May 27, 2004.
Office Action for European Patent Application No. 03736356.1 dated Feb. 17, 2006.
Office Action for U.S. Appl. No. 10/790,031 dated Feb. 22, 2006.

Office Action for U.S. Appl. No. 10/789,992 dated Apr. 10, 2006.
Office Action for U.S. Appl. No. 10/789,992 dated Oct. 12, 2006.
Office Action for U.S. Appl. No. 10/789,992 dated Jul. 12, 2007.
Office Action for Russian Patent Application No. 2004124944/28(027284) dated Jul. 6, 2007.
Office Action for European Patent Application No. 03 736 356.1 dated Oct. 26, 2007.
Office Action for Chinese Patent Application No. 200480007952.0 dated Dec. 7, 2007.
Office Action for U.S. Patent Application No. 10/426,020 Dec. 28, 2007.
Office Action for Japanese Patent Application No. 2004-519328 dated Feb. 6, 2008.
Office Action for U.S. Appl. No. 10/780,756 dated Mar. 28, 2008.
Philips Electronics; Formatter for pre-recorded formats, 2004.
Philips Electronics; Formatter for Recordable-Rewritable Formats, 2004.
Memorex White Paper Reference Guide for Optical Media, 2008 (as printed out).
Office Action for U.S. Appl. No. 10/426,020 dated Mar. 22, 2006.
Office Action for U.S. Appl. No. 10/426,020 dated Dec. 12, 2006.
Office Action for U.S. Appl. No. 10/426,020 dated May 31, 2007.
Office Action for U.S. Appl. No. 10/989,292 dated Apr. 22, 2008.
Office Action for U.S. Appl. No. 10/789,992 dated Apr. 23, 2008.
Office Action for related European patent application No. 03721120.8-2210 dated Mar. 14, 2008.
Office Action for related European patent application No. 07023886.0-2210 dated Mar. 25, 2008.
Office Action for related Japanese patent application No. 2005-214336 dated Jun. 3, 2008.
Office Action for related Korean patent application No. 10-2007-0042296 dated Jul. 22, 2008.
Office Action for related Korean patent application No. 10-2002-0023983 dated May 30, 2008.
Office Action for related Russian patent application No. 2004124944 dated Feb. 28, 2008.
Office Action for related U.S. Appl. No. 10/426,020 dated Aug. 1, 2008.
Office Action for Japanese patent application No. 2005-210963 dated Jul. 14, 2009.
Office Action for Korean patent application No. 10-2002-0077358 dated Jul. 16, 2009.
Notice of Allowance for U.S. Appl. No. 10/780,756 dated Mar. 20, 2009.
Satoh et al., "Key Technology for High Density Rewritable DVD (DVD-RAM)," IEEE Transactions on Magnetics, vol. 34, Issue 2, Part 1, Mar. 1998, pp. 337-342.
Fuji et al., "Recording and Readout Using Clock Marks Premastered by Groove Wobbling," IEEE Transactions on Magnetics, vol. 36, Issue 3, May 2000, pp. 597-603.
Kaneda, Yoshiyuki, "Advanced Optical Disk Mastering and Its Application for Extremely High-Density Magnetic Recording," IEEE Transactions on Industrial Electronics, vol. 42, Issue 3, Jun. 1995, pp. 257-262.
Office Action for Japanese patent application No. 2006-502712 dated Sep. 1, 2009 (with English translation).

* cited by examiner

Biphase modulated HFM groove

Push / Pull Method

DPD Method

Case 1

Case 2

HIGH-DENSITY READ-ONLY OPTICAL DISC, AND OPTICAL DISC APPARATUS AND METHOD USING THE SAME

CROSS-REFERENCE TO RELATED APPLICATIONS

This application is a divisional of co-pending application Ser. No. 10/426,020, filed Apr. 30, 2003, the entire contents of which are hereby incorporated by reference and for which priority is claimed under 35. U.S.C. § 120.

BACKGROUND OF THE INVENTION

1. Field of the Invention

The present invention relates to a high-density read-only optical disc on which large-capacity video and audio data are recorded and stored, and an optical disc apparatus and method of using the same.

2. Description of the Related Art

Recently, standardization of a new high-density rewritable optical disc, which can permanently record and store high-quality video data and audio data, e.g., a BD-RW (Blu-ray Disc Rewritable), is rapidly progressing. It is expected that related products will be developed, presented and commercialized in the near future.

With reference to FIG. 1, the structure of a BD-RW is divided into an inner surface, an intermediate surface and an outer surface. The inner surface includes a clamping area, a transition area, a BCA (Burst Cutting Area) and a lead-in area formed in that order. The intermediate and outer surfaces include a data area and a lead-out area, respectively.

The lead-in area is divided into a first guard-1 sub-area ("Guard 1"), a Permanent Information and Control data sub-area ("PIC"), a second guard-2 sub-area ("Guard 2"), an "Info 2" sub-area, an Optimum Power Control sub-area ("OPC"), etc. The first guard-1 sub-area and the PIC sub-area are pre-recorded areas where data is previously recorded, whereas the lead-in area, the data area and the lead-out area are rewritable areas on which new data is rewritable.

The PIC sub-area is an area on which disc information is permanently recorded and stored. The disc information is basic information required for recording or reproducing user data on or from the data area. A HFM (High-Frequency Modulated) groove is formed on the PIC sub-area.

As shown in FIG. 2, the HFM groove has disc data modulated by a bi-phase modulation and stored thereon. For example, if the HFM groove is formed in the form of in-phase patterns in a recording section of 36T, a data value of "1" is recorded on the HFM groove. Further, if the HFM groove is formed in the form of anti-phase patterns in the recording section of 36T, a data value of "1" is recorded on the HFM groove.

A tracking servo for tracking a signal of the HFM groove, recorded on the PIC sub-area, uses the well-known push/pull method. In this case, an optical disc apparatus as shown in FIG. 3 includes a 2-element PD (photodiode) 12 for converting light received through an OL (Objective Lens) 10 and a CL (Collimating Lens) 11 into electric signals Ea and Eb; and a differential amplifier 13 for carrying out a differential amplification for the electric signals Ea and Eb outputted by the 2-element PD 12 and then outputting a tracking error signal TE=(Ea−Eb).

The optical disc apparatus performs a tracking servo operation by referring to the tracking error signal TE=(Ea−Eb). Moreover, in relation to a wobbled groove formed on the data area and the lead-in area, the optical disc apparatus enables a tracking servo operation for the wobbled groove to be carried out by referring to the tracking error signal TE=(Ea−Eb).

A BD-ROM (Blu-ray disc ROM (Read Only Memory)), in contrast with the above-described BD-RW, is a high-density read-only optical disc. As shown in FIG. 4, a structure of the BD-ROM is divided into an inner surface, an intermediate surface and an outer surface. The inner surface includes a clamping area and a lead-in area. The intermediate and outer surfaces include a data area and a lead-out area, respectively. The lead-in area has disc information recorded on the basis of an HFM (High-Frequency Modulated) groove as in the BD-RW. The data area and the lead-out area have data in pre-pit strings as in a conventional CD-ROM (Compact Disc-Read Only Memory) or DVD-ROM (Digital Versatile Disc-Read Only Memory).

If the lead-in area of the BD-ROM has the disc information recorded in the HFM groove as in the BD-RW, a tracking servo based on a push/pull method for the HFM groove is required. Simultaneously, another tracking servo based on a DPD (Differential Phase Detection) method for the pre-pit strings recorded on the data area and the lead-out area is also required.

Where only the HFM groove is formed on the lead-in area and the pre-pit data is not recorded on the lead-in area, there is a problem in that concatenated playback of the lead-in area and the data area is cut off because a PLL (Phase Locked Loop) circuit using an RF (Radio Frequency) does not operate.

FIG. 5 is a view illustrating the configuration of a tracking servo based on a DPD (Differential Phase Detection) method, which is applied to a conventional optical disc apparatus.

As shown in FIG. 5, the optical disc apparatus includes a 4-element PD (photodiode) 22 for converting light received through an OL (Objective Lens) 20 and a CL (Collimating Lens) 21 into electric signals Ea, Eb, Ec and Ed; phase detectors (PHs) 26, 27, 28 and 29 for detecting phases of the electric signals Eb, Ed, Ec and Ea; summing amplifiers 23 and 24 for summing the electric signals Eb and Ed outputted from the phase detectors 26 and 27 and the electric signals Ec and Ea outputted from the phase detectors 28 and 29 to generate summed electric signals Eb+Ed and Ec+Ea; and a differential amplifier 25 for carrying out a differential amplification for the summed electric signals Eb+Ed and Ea+Ec outputted by the summing amplifiers 23 and 24 and then outputting a tracking error signal TE=((Ea+Ec)−(Eb+Ed)).

Further, different tracking servo operations, i.e., a tracking servo operation based on a push/pull method and another tracking servo operation based on the DPD method, must be carried out for the same BD-ROM inserted into the optical disc apparatus. As a result, because the conventional optical disc apparatus requires a complex algorithm to control the different tracking servo operations, there is another problem in that a size of the conventional optical disc apparatus increases to accommodate these two tracking servo systems.

SUMMARY OF THE INVENTION

It is an object of the present invention to provide an apparatus and method capable of recording data on a lead-in area of a high-density read-only optical disc such as a BD-ROM (Blu-ray disc ROM (Read Only Memory)) in the form of pre-pit strings associated with an HFM (High-Frequency Modulated) groove, and continuously applying the same tracking servo operation to an entire area of the high-density read-only optical disc or a high-density rewritable optical disc.

In accordance with one aspect of the present invention, the above and other objects can be accomplished by the provision of a high-density read-only optical disc including a lead-in area, a data area and a lead-out area, on which data of pre-pit strings are recorded, wherein the lead-in area has the pre-pit strings continuously formed on a same track line in a predetermined recording section or has the pre-pit strings discontinuously formed on different positions within a same track line in a predetermined recording section.

In accordance with another aspect of the present invention, there is provided a high-density optical disc apparatus, comprising: photoelectric conversion means for receiving light reflected from an optical disc and outputting a plurality of electric signals; first detection means for carrying out a summing operation and a differential amplification for the outputted electric signals and detecting a tracking error signal based on a push/pull method; second detection means for detecting the outputted electric signals, carrying out a summing operation and a differential operation for electric signals having different phases, and detecting a tracking error signal based on a DPD (Differential Phase Detection) method; and output means for selectively outputting one of the tracking error signals based on the push/pull method and the DPD method detected by the first and second detection means according to a type of the optical disc.

In accordance with yet another aspect of the present invention, there is provided a method for reproducing data from an optical disc, comprising the steps of: (a) converting light reflected from the optical disc into a plurality of electric signals; (b) carrying out a summing operation and a differential amplification for the outputted electric signals and detecting a tracking error signal based on a push/pull method and a tracking error signal based on a DPD (Differential Phase Detection) method; and (c) selecting one of the tracking error signals based on the push/pull method and the DPD method detected by the first and second detection means according to a type of the optical disc and carrying out a tracking servo operation corresponding to the selected tracking error signal.

In accordance with an aspect of the present invention, the above and other objects can be accomplished by the provision of a high-density read-only optical disc including a lead-in area, a data area and a lead-out area, having: a specific area contained in the lead-in area on which pit strings having a recording pattern of an HFM (High-Frequency Modulated) groove, based on a bi-phase modulation, are formed, wherein the specific area has 2n+1 (odd) number of spaces and marks or marks and spaces repeatedly formed in a same-level recording section of the HFM groove based on the bi-phase modulation.

In accordance with another aspect of the present invention, the above and other objects can be accomplished by the provision of a high-density read-only optical disc including a lead-in area, a data area and a lead-out area, having: a specific area contained in the lead-in area on which a pit string of a mark and space or a space and mark having a recording pattern of an HFM (High-Frequency Modulated) groove based on a bi-phase modulation, is formed, wherein the HFM groove based on the bi-phase modulation has a level transition point formed on the basis of a center of a space.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of a high-density read-only optical disc, and an optical disc apparatus and method using the same in accordance with the present invention will be described in detail with reference to annexed drawings.

Figure 6:
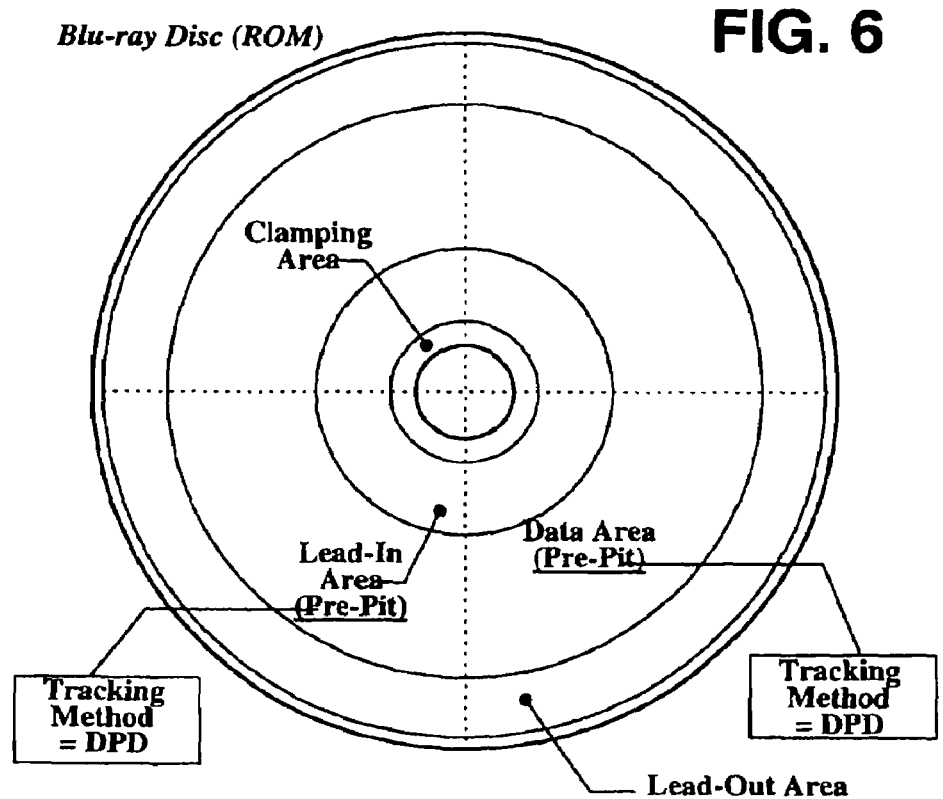
FIG. 6 is a view illustrating the structure of a BD-ROM (Blu-ray disc ROM (Read Only Memory)) in accordance with an embodiment of the present invention.

FIG. 6 is a view illustrating the structure of a BD-ROM (Blu-ray disc ROM (Read Only Memory)) of a high-density read-only optical disc in accordance with an embodiment of the present invention.

Figure 1:
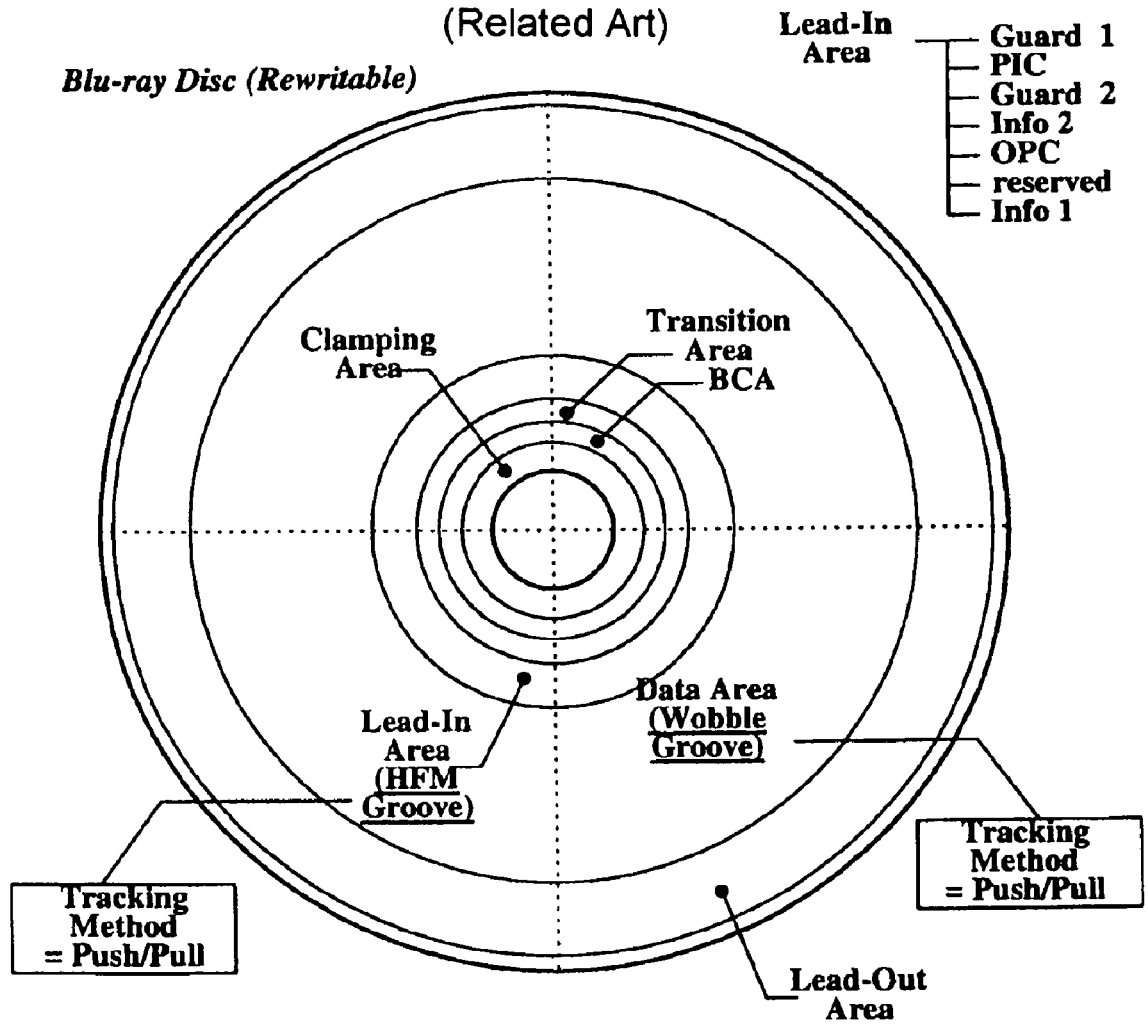
FIG. 1 is a view illustrating the structure of a conventional BD-RW (Blu-ray Disc Rewritable)
Figure 2:
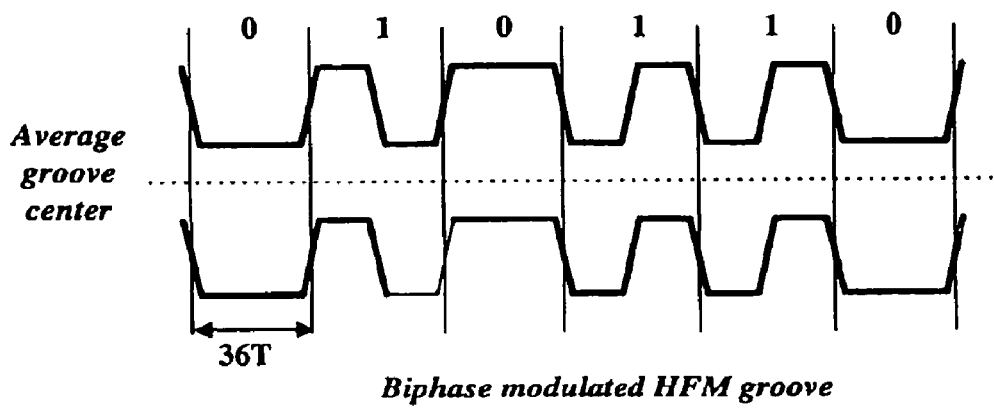
FIG. 2 is a view illustrating the shape of an HFM (High-Frequency Modulated) groove formed on a lead-in area of the conventional BD-RW.
Figure 3:
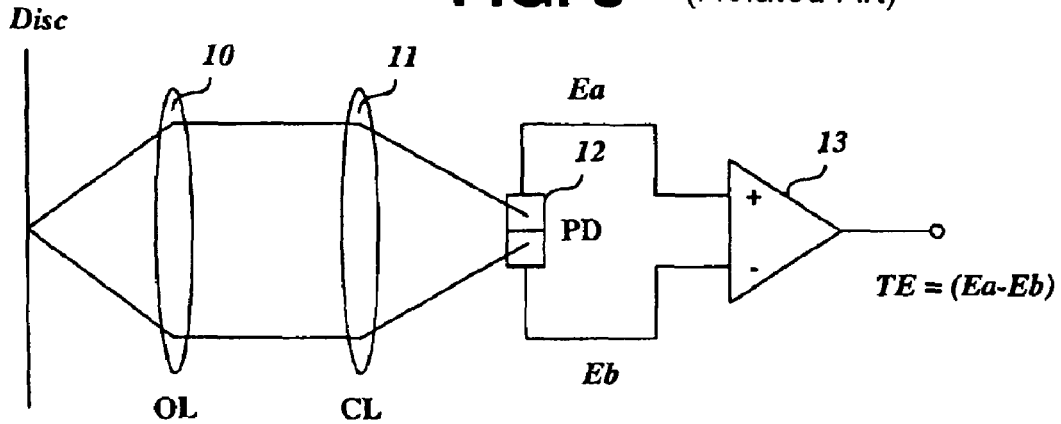
FIG. 3 is a view illustrating the configuration of a tracking servo based on a push/pull method, which is applied to an optical disc apparatus for the conventional BD-RW.
Figure 4:
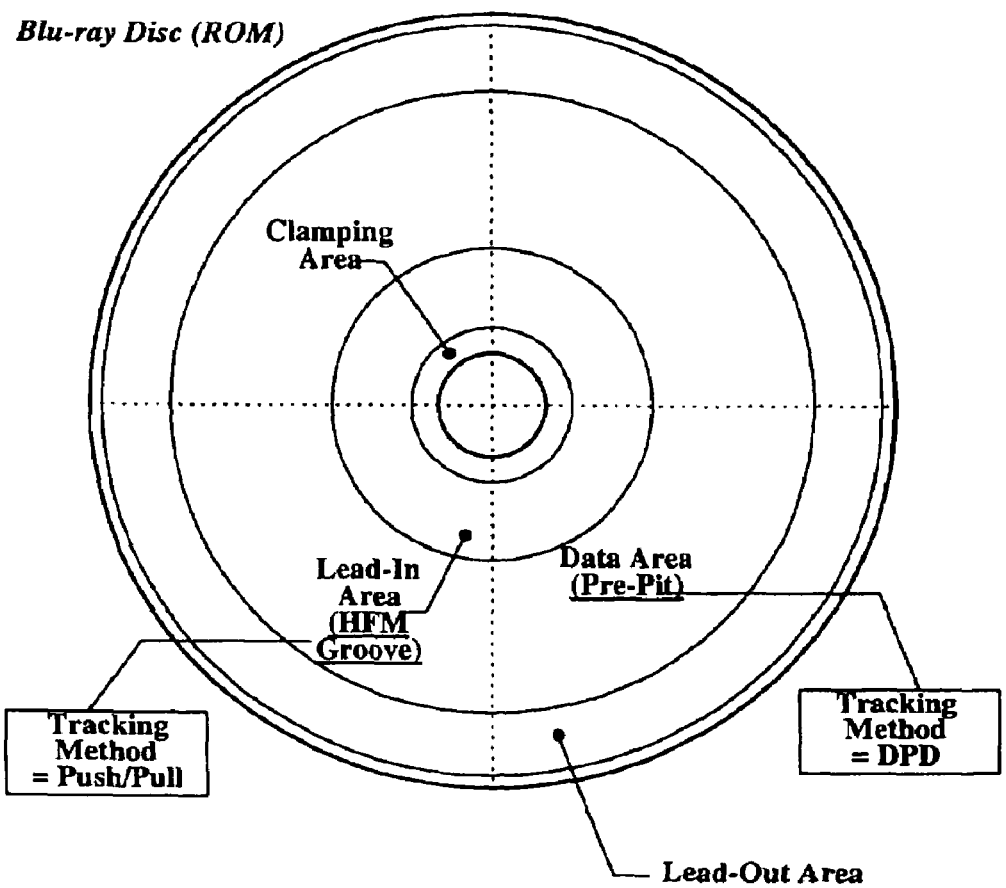
FIG. 4 is a view illustrating the structure of a conventional BD-ROM (Blu-ray disc ROM (Read Only Memory))
Figure 5:
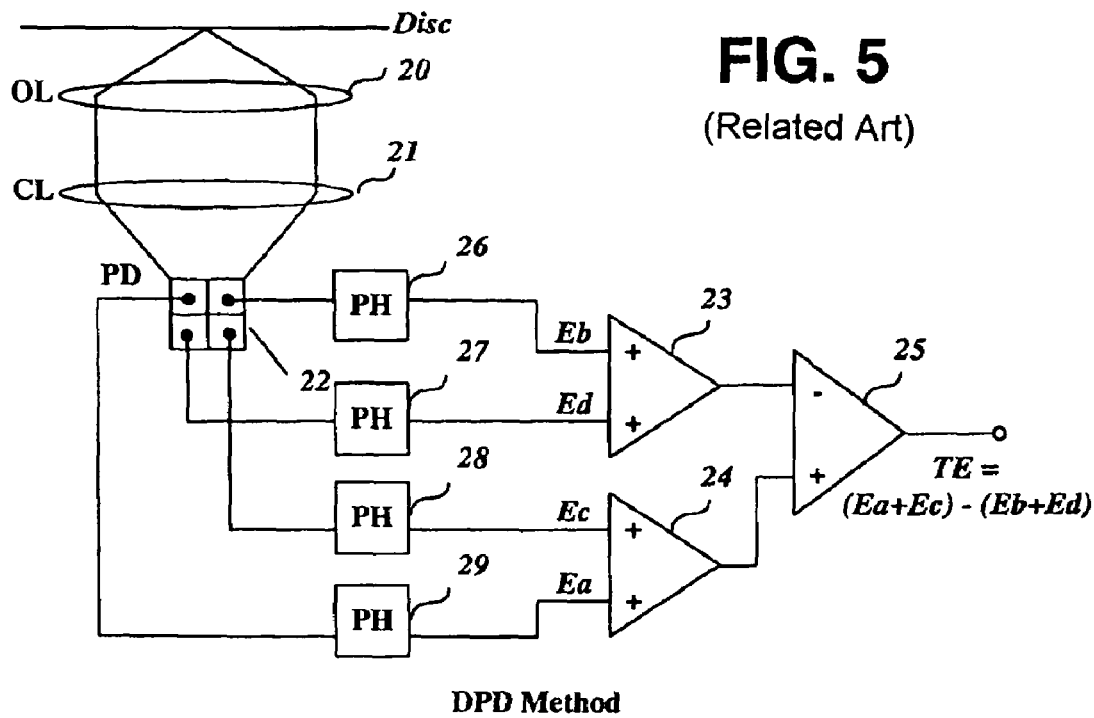
FIG. 5 is a view illustrating the configuration of a tracking servo based on a DPD (Differential Phase Detection) method, which is applied to a conventional optical disc apparatus.

FIG. 6 illustrates a structure of the BD-ROM having an inner surface, an intermediate surface and an outer surface, that is similar to that described above in conjunction with FIG. 4. The inner surface includes a clamping area and a lead-in area. The intermediate and outer surfaces include a data area and a lead-out area, respectively. The data area and the lead-out area have data recorded in pre-pit strings as in a conventional CD-ROM (Compact Disc-Read Only Memory) or DVD-ROM (Digital Versatile Disc-Read Only Memory).

However, unlike conventional read-only optical discs, data in the form of pre-pit strings are recorded and stored on the lead-in area in a manner similar to the HFM groove having pre-recorded data formed in the PIC sub-area of the lead-in area contained on the BD-RW. In other words, the data, in the form of the pre-pit strings, are recorded on the lead-in area of the BD-ROM in a manner similar to how data is recorded in pre-pit areas on the data area and the lead-out area of the BD-ROM.

An optical disc apparatus for reproducing the data of the pre-pit strings enables a tracking servo operation based on the DPD (Differential Phase Detection) method to be consistently applied to an entire area of the same BD-ROM when inserted into the apparatus. Or more simply, the same servo tracking method may be used in each of the lead-in, data and lead-out areas.

Figure 7:
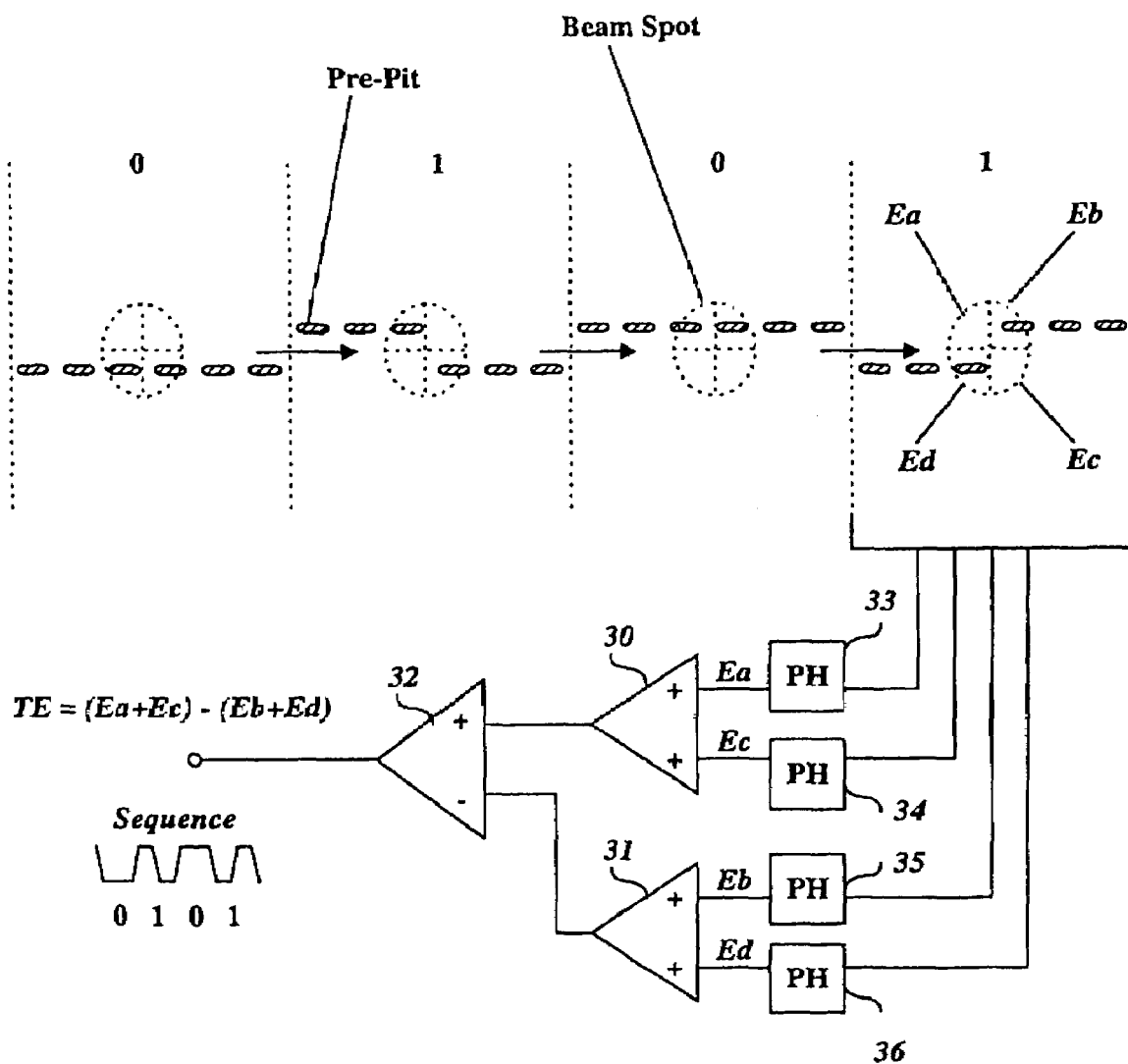
FIG. 7 is a view illustrating the shape of pre-pit strings formed on a lead-in area of the BD-ROM in accordance with the present invention.

FIG. 7 is a view illustrating the shape of pre-pit strings formed on the lead-in area of the BD-ROM in accordance with the present invention. As shown there, in a pattern of the pre-pit strings formed on the lead-in area, the pre-pit strings can be continuously formed on the same track line in a predetermined recording section. Alternatively, the pre-pit strings can be discontinuously formed on different positions within the same track.

For example, a data sequence having a value of "0101" is recorded on the lead-in area. The length of each bit cell is 36T, where T corresponds to the length of a Channel bit. A recording section of 36T has a data value of "0" when six 3T pre-pits are formed on the same track line, whereas another recording section of 36T has a data value of "1" when two strings are formed on different positions within the same track, wherein each of the two strings has three 3T pre-pits. As the pre-pit strings are formed as described above, disc information can be recorded by forming the pre-pit strings as described above, similarly to the HFM groove.

Light reflected from the pre-pit strings, continuously and discontinuously formed on the lead-in area, is converted into electric signals by a 4-element photodiode (not shown), which is applied to a tracking servo based on a conventional DPD method. At this time, the electric signals Ea, Eb, Ec and Ed are applied to a plurality of phase detectors (PHs) 33, 34, 35 and 36, first and second summing amplifiers 30 and 31 and a differential amplifier 32. A tracking error signal TE=((Ea+Ec)−(Eb+Ed)) is then produced based on the DPD method. The tracking error signal is thereafter outputted from the differential amplifier 32.

Thus, a tracking servo operation based on the DPD method for the pre-pit strings can be applied to the lead-in area. The recorded data sequence of "0101" is detected and decoded by filtering a DPD signal in accordance with a corresponding frequency. The optical disc apparatus continuously carries out a tracking servo operation based on the DPD method, such that the optical disc apparatus can appropriately apply the tracking servo operation to an entire area of the BD-ROM. As a result, disc information can be recorded using the pre-pit strings (as in the HFM groove), and the same PLL (Phase Locked Loop) circuit operation can be carried out from the lead-in area to other areas.

Lengths of respective pits formed on the lead-in area can be the same as each other. Alternatively, for example, two or three types of the lengths of respective pits can be formed on the lead-in area.

Unique patterns or shapes of the pit strings may represent different values of information. Adjusting the depth of a pit to be shallower or deeper than the depth of "λ4" may be used for detecting a small push/pull signal. For example, the depth of a pit has a value of "3λ4" in the case of the BD-ROM, and the depths of pits of the lead-in area and the data area have different values of "λ8" and "λ4" in the case of the BD-RW, respectively.

The pre-pit strings use a modulation code in the data area. The modulation code is based on a length selected from the group consisting of 2T, 3T or others. A plurality of different data can be additionally recorded on pits.

Figure 8:
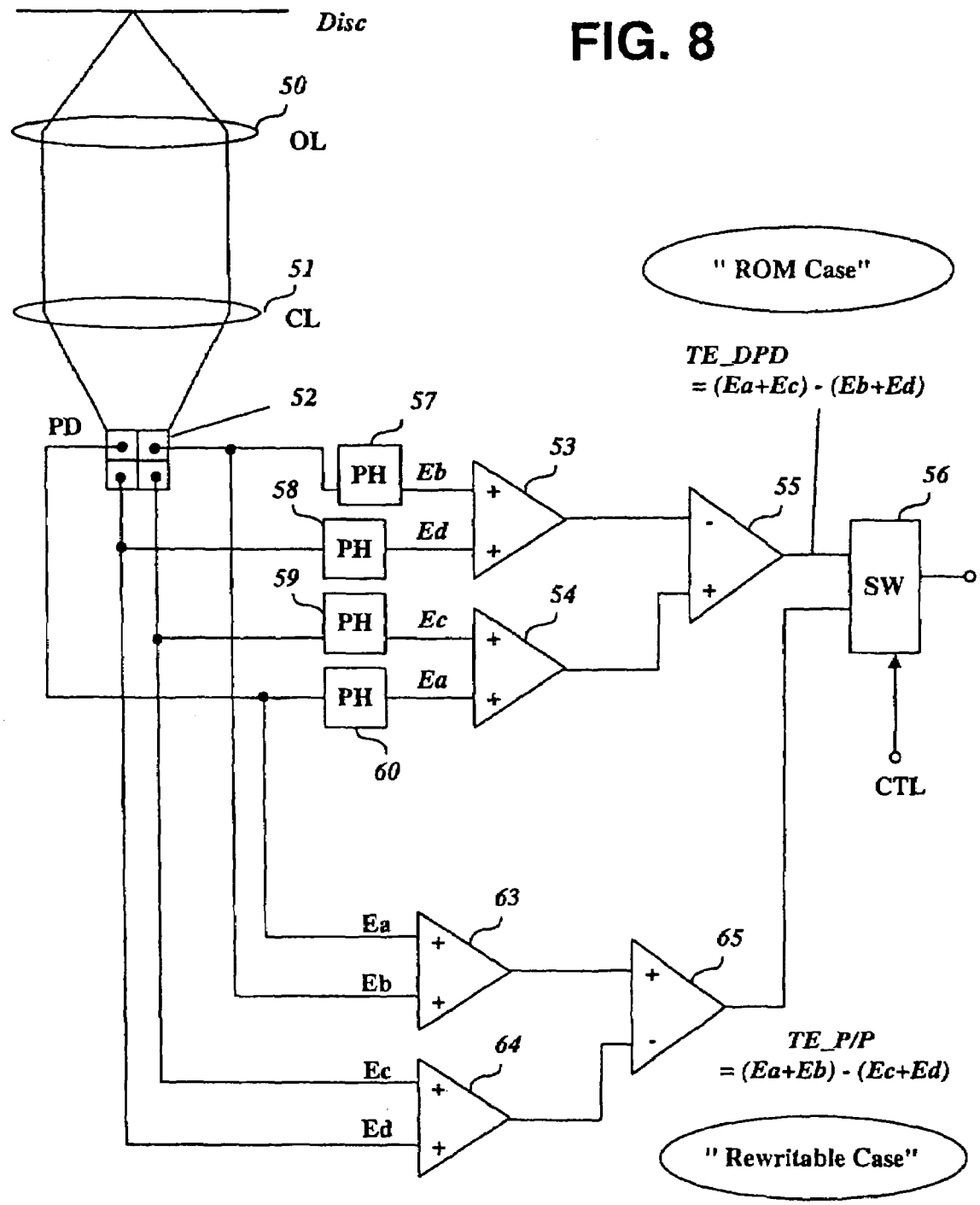
FIG. 8 is a view illustrating the configuration of a tracking servo based on a push/pull method and a DPD (Differential Phase Detection) method, which is applied to an optical disc apparatus and method using an optical disc.

In a different embodiment, FIG. 8 is a view illustrating the configuration of a tracking servo based on a push/pull method and a DPD (Differential Phase Detection) method, which is applied to an optical disc apparatus and method using an optical disc. The optical disc apparatus in accordance with the present invention enables a tracking servo operation corresponding to the optical disc to be selectively carried out where a BD-RW or a BD-ROM is inserted into the apparatus.

For this, the optical disc apparatus includes an OL (Objective Lens) 50, a CL (Collimating Lens) 51, a 4-element PD (photodiode) 52, a plurality of summing amplifiers 53, 54, 63 and 64, differential amplifiers 55 and 65, and a selection switch 56. The functionalities of components included in the optical disc apparatus will be described in detail.

First, where a BD-RW or BD-ROM is inserted into the optical disc apparatus, light reflected through the OL 50 and the CL 51 is converted into electric signals Ea, Eb, Ec and Ed. In the case of a ROM, the electric signals Ea, Eb, Ec and Ed are applied to the first and second summing amplifiers 53 and 54 and the first differential amplifier 55. As a result, a tracking error signal TE_DPD=(Ea+Ec)−(Eb+Ed)) based on the DPD method is detected and outputted.

In the case of a BD-RW (or rewritable case), the electric signals Ea, Eb, Ec and Ed outputted by the 4-element PD 52 are applied to the third and fourth summing amplifiers 63 and 64 and the second differential amplifier 65. As a result, a tracking error signal TE_P/P=((Ea+Eb)−(Ec+Ed)) based on the push/pull method is detected and outputted.

Where an optical disc inserted into the apparatus is a BD-ROM, a microcomputer (not shown) and a servo controller (not shown), provided in the optical disc apparatus, control an operation of a selection switch 56 such that the tracking error signal TE_DPD based on the DPD method detected and outputted by the first differential amplifier 55 can be selectively outputted. Otherwise, where an optical disc inserted into the apparatus is a BD-RW, the microcomputer and the servo controller, provided in the optical disc apparatus, control an operation of the selection switch 56 such that the tracking error signal TE_P/P based on the push/pull method detected and outputted by the second differential amplifier 65 can be selectively outputted.

In other words, the tracking servo operation based on the push/pull method is selectively carried out in the case of a BD-RW, whereas the tracking servo operation based on the DPD method is selectively carried out in the case of a BD-ROM.

Where an optical disc apparatus for the BD-ROM is developed and supplied, only the tracking servo operation based on the DPD method as described above can be employed.

Another aspect of the invention will be described in detail with reference to FIGS. 9 to 11.

A push/pull signal must be continuously detected at wobbled spaces and marks or at spaces and marks repeatedly formed on the PIC sub-area without cutoff such that major information of the optical disc permanently recorded on the PIC sub-area contained in a lead-in area of the BD-ROM can be correctly decoded.

First, the PIC sub-area of the BD-ROM in accordance with the present invention can include pit strings having a recording pattern of a HFM (High-Frequency Modulated) groove based on a bi-phase modulation, wherein the major information is recorded in the form of the pit strings.

Moreover, if a HFM groove of in-phase patterns is formed in a recording section of 36T, a data value of "0" is recorded. Otherwise, if a HFM groove of anti-phase patterns is formed in the recording section of 36T, a data value of "1" is recorded. At this time, 2n+1 (odd) number of spaces and marks or marks and spaces are repeatedly formed in the same level section.

Figure 9:
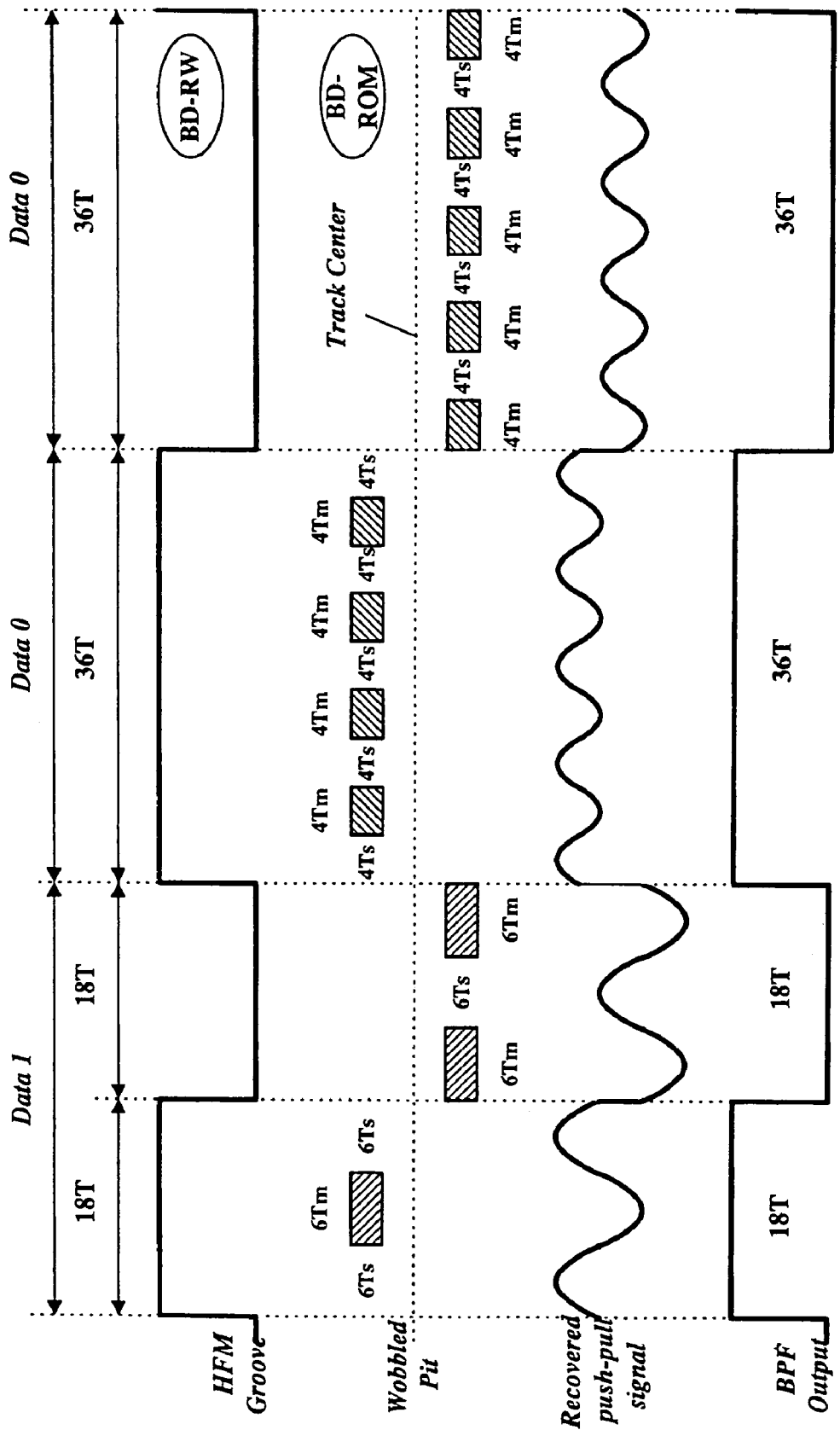
FIGS. 9 to 11 are views illustrating wobbled spaces and marks formed on a PIC (Permanent Information and Control data) sub-area of the BD-ROM in accordance with an embodiment of the present invention.

For example, as shown in FIG. 9, a space 6Ts, a mark 6Tm and a space 6Ts each having a length 6T are sequentially and repeatedly formed in 18T recording sections of a high recording level corresponding to the data value of "1". Further, a mark 6Tm, a space 6Ts and a mark 6Tm, each having a length 6T, are sequentially and repeatedly formed in 18T recording sections of a low recording level corresponding to the data value of "1".

That is, the "space, mark, space" or "mark, space, mark" combinations have a predetermined length that are sequentially and repeatedly formed in the 18T recording sections. At this time, the sum of space(s) and mark(s) repeatedly formed in the recording section of the low or high recording level is three, i.e., an odd number. Moreover, the spaces or marks are formed at start and end parts of a corresponding recording section.

In contrast, a space 4Ts and a mark 4Tm each having a length 4T are sequentially and repeatedly formed in each of 36T recording sections of the high recording level corresponding to the data value of "0". Further, a mark 4Tm and a space 4Ts each having a length 4T are sequentially and repeatedly formed in each of 36T recording sections of the low recording level corresponding to the data value of "0".

That is, the "space and mark" or the "mark and space" combinations have a predetermined length that are sequentially and repeatedly formed in each of the 36T recording sections. At this time, the sum of the spaces and marks repeatedly formed in the recording section of the low or high recording level is nine, i.e., an odd number. Moreover, the spaces or marks are formed at start and end parts of a corresponding recording section.

A space and mark are respectively formed at the left and right of a low-level transition point of the HFM groove based on the bi-phase modulation. A mark and space are respectively formed at the left and right of a high-level transition point of the HFM groove based on the bi-phase modulation, respectively.

For example, as shown in FIG. 9, a space 6Ts, and a mark 6Tm each having a length 6T, are formed at the left and right of a level transition point Tr1 directed to an 18T recording section of the low recording level from an 18T recording section of the high recording level corresponding to the data value of "1", respectively. A mark 6Tm of a length 6T and a space 4Ts of a length 4T are respectively formed at the left and right of a level transition point Tr2 directed to a 36T recording section of the high recording level from an 18T recording section of the low recording level corresponding to the data value of "1".

A space 4Ts of a length 4T and a mark 4Tm of a length 4T are respectively formed at the left and right of a level transition point Tr3 directed to a 36T recording section of the low recording level from a 36T recording section of the high recording level. Accordingly, the cutoff of the push/pull signal detected at the level transition point is minimized.

Figure 10:
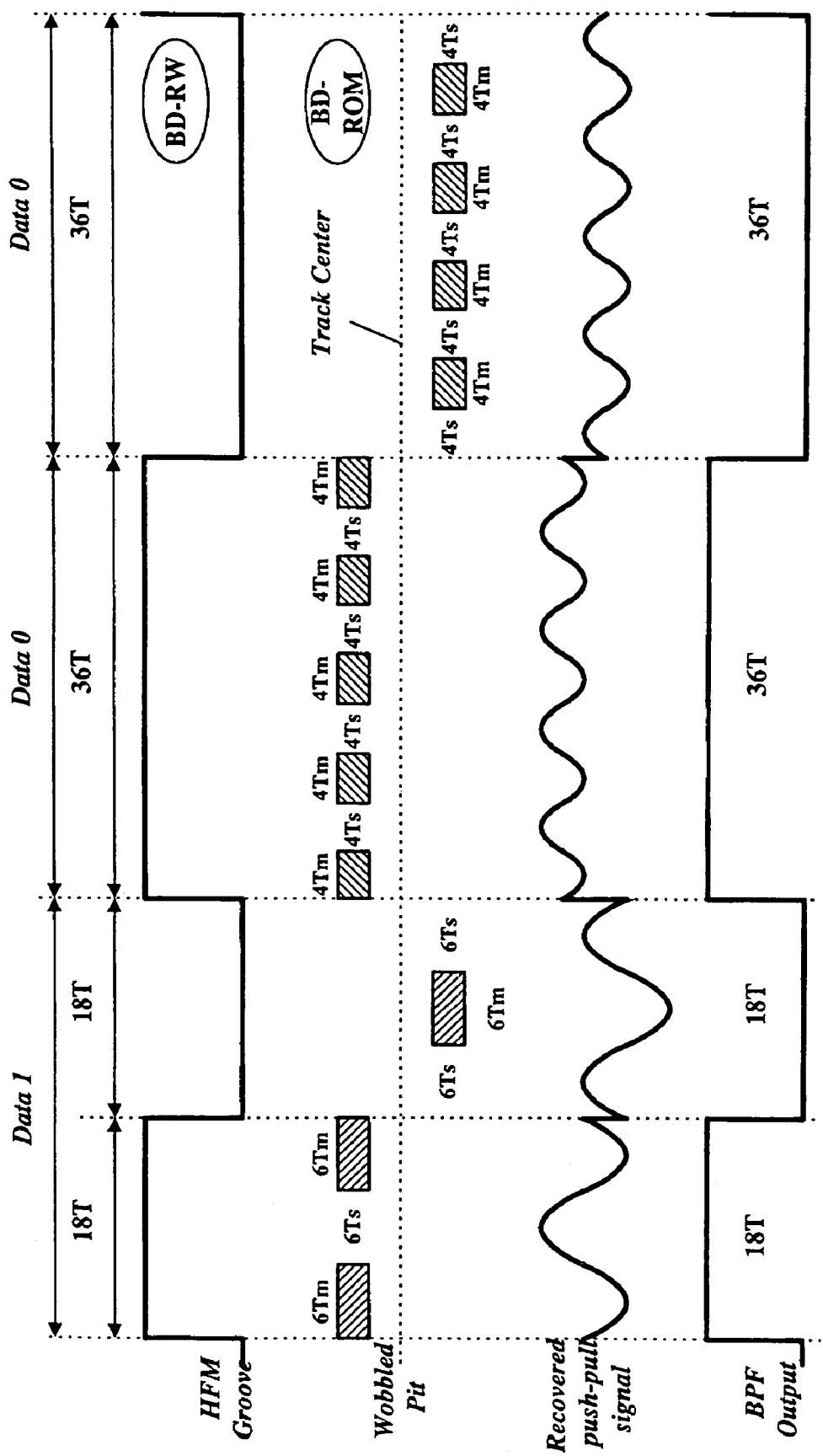

As shown in FIG. 10, a mark 6Tm and a space 6Ts each having a length 6T are respectively formed at the left and right of a level transition point Tr4 directed to an 18T recording section of the low recording level from an 18T recording section of the high recording level corresponding to the data value of "1". Further, a space 6Ts of a length 6T and a mark 4Ts of a length 4T are respectively formed at the left and right of a level transition point Tr5 directed to a 36T recording section of the high recording level from an 18T recording section of the low recording level corresponding to the data value of "1". At this time, the push/pull signal detected at the level transition point can be cut off and hence a decoding operation cannot be correctly carried out.

It is an advantage that a frequency of the push/pull signal is far away from a frequency of general data signal such that the push/pull signal detected from the wobbled space and mark can be classified and detected more correctly than an RF (Radio Frequency) signal detected from general pre-pit data.

Thus, it is preferable that the pit length of a space or mark is short, if possible. For example, the pit length of a space or mark can be 2T, 3T or others.

Moreover, it is preferable that the pit length of the space or mark formed in the same level section of the HFM groove based on the bi-phase modulation is set for an appropriate tracking servo operation such that a DSV (Digital Sum Value) becomes zero or a minimum value.

Figure 11:
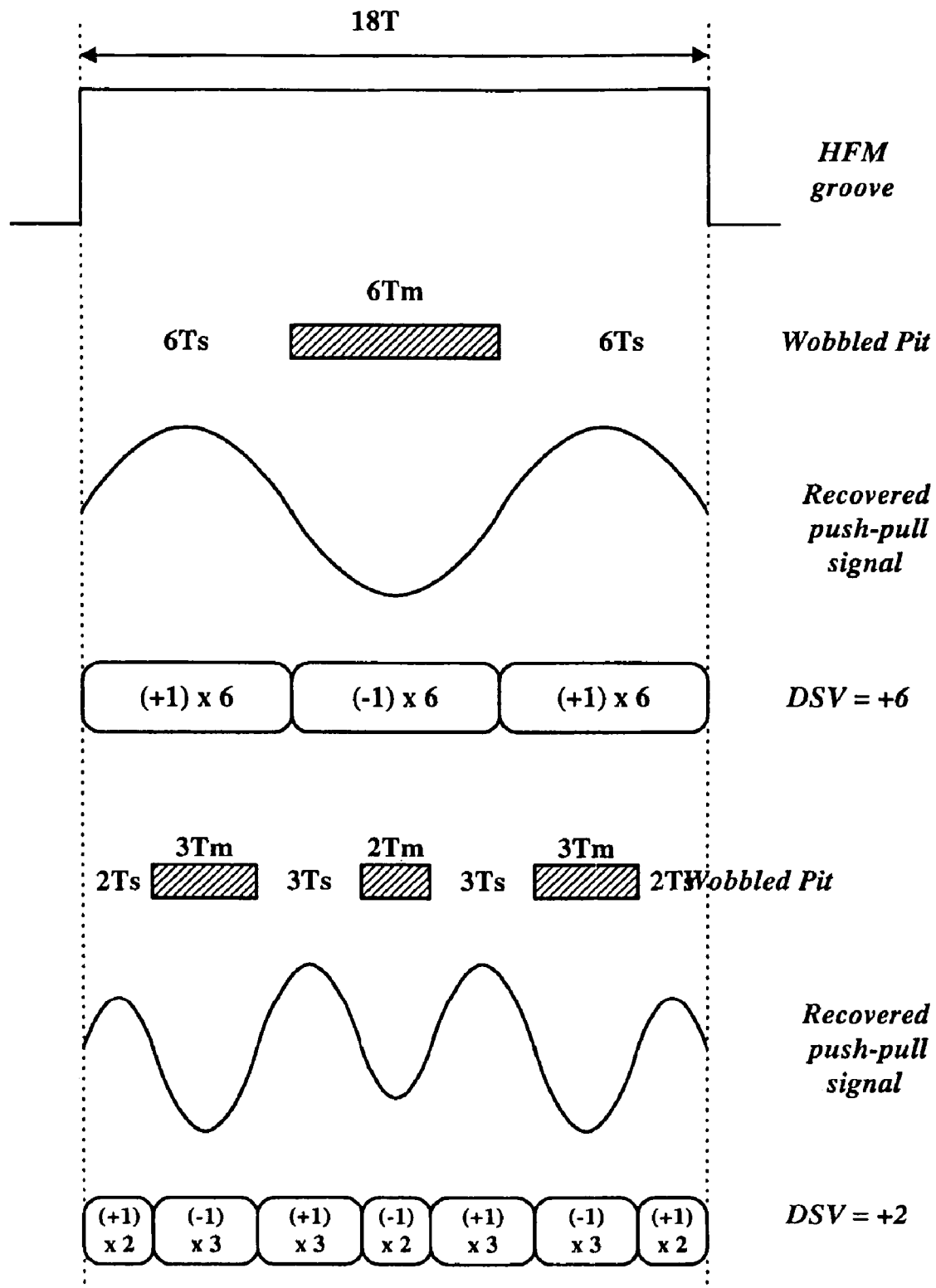

For example, as shown in FIG. 11, where a space 6Ts, a mark 6Tm, and a space 6Ts, each having a length 6T, are sequentially formed in the 18T recording section of the high recording level corresponding to the data value of "1", the DSV calculated by a conventional equation becomes "+6". However as illustrated in the lower portion of FIG. 11, where a combination of a space 2Ts or 3Ts of the length 2T or 3T and a mark 2Tm or 3Tm of the length 2T or 3T is formed in the 18T recording section, the DSV becomes "+2". Under these conditions, the tracking servo operation can be more appropriately performed.

It is preferable that a space or mark, having a relatively longer pit length among the spaces and marks of the lengths where the DSV becomes zero or a minimum value, is formed at an end part of the same level section.

For example, ten spaces 3Ts or marks 3Tm, and, three spaces 2Ts or marks 2Tm, can be formed in the "36T" recording section of the high recording level corresponding to the data value of "0". Where spaces and marks are formed in the order of 2Ts, 3Tm, 3Ts, 3Tm, 3Ts, 3Tm, 2Ts, 3Tm, 3Ts, 3Tm, 3Ts, 3Tm and 2Ts as a first embodiment or formed in the order of 3Ts, 3Tm, 2Ts, 3Tm, 3Ts, 3Tm, 2Ts, 3Tm, 3Ts, 3Tm, 2Ts, 3Tm and 3Ts as a second embodiment, both DSVs in the first and second embodiments become zero. However, the space having the relatively longer length, i.e., the space 3Ts of a length 3T, is formed at the end part of the recording section as in the second embodiment such that the push/pull signal can be detected more correctly at the level transition point.

For reference, where six spaces 3Ts or marks 3Tm having a length 3T and nine spaces 2Ts or marks 2Tm having a length 2T are formed in the "36T" recording section, it is preferable that the spaces and marks or the marks and spaces are formed in the order of 2Ts, 2Tm, 2Ts, 3Tm, 3Ts, 3Tm, 2Ts, 2Tm, 2Ts, 3Tm, 3Ts, 3Tm, 2Ts, 2Tm and 2Ts.

Moreover, where four spaces 3TS or marks 3Tm having the length 3T and three spaces 2Ts or marks 2Tm having the length 2T are formed in the "18T" recording section, it is preferable that the spaces and marks or the marks and spaces are formed in the order of 2Ts, 3Tm, 3Ts, 2Tm, 3Ts, 3Tm and 2Ts.

The level transition point can be set such that a level transition is accomplished on the basis of a center of a space. At this time, the sum of marks and spaces or the sum of spaces and marks is kept as an odd number.

With reference to FIGS. 12-15, a push/pull signal must be continuously detected at wobbled spaces and marks or at spaces and marks repeatedly formed on the PIC sub-area without cutoff such that major information of the optical disc permanently recorded on the PIC sub-area contained in a lead-in area of the BD-ROM can be correctly decoded. This will be described in detail.

As discussed previously, a BD-ROM (Blu-ray Disc ROM (Read Only Memory)) includes a PIC (Permanent Information and Control data) sub-area on which pit strings having a recording pattern of an HFM (High-Frequency Modulated) groove based on a bi-phase modulation are formed. The PIC sub-area has information recorded in the form of pit strings. A level transition or level transition point of the HFM groove based on the bi-phase modulation is made on the basis of a center of a space.

If the HFM groove is formed of in-phase patterns in a recording section of 36T, a data value of "0" is recorded on the HFM groove. Otherwise, if the HFM groove is formed of anti-phase patterns in the recording section of 36T, a data value of "1" is recorded on the HFM groove.

Figure 12:
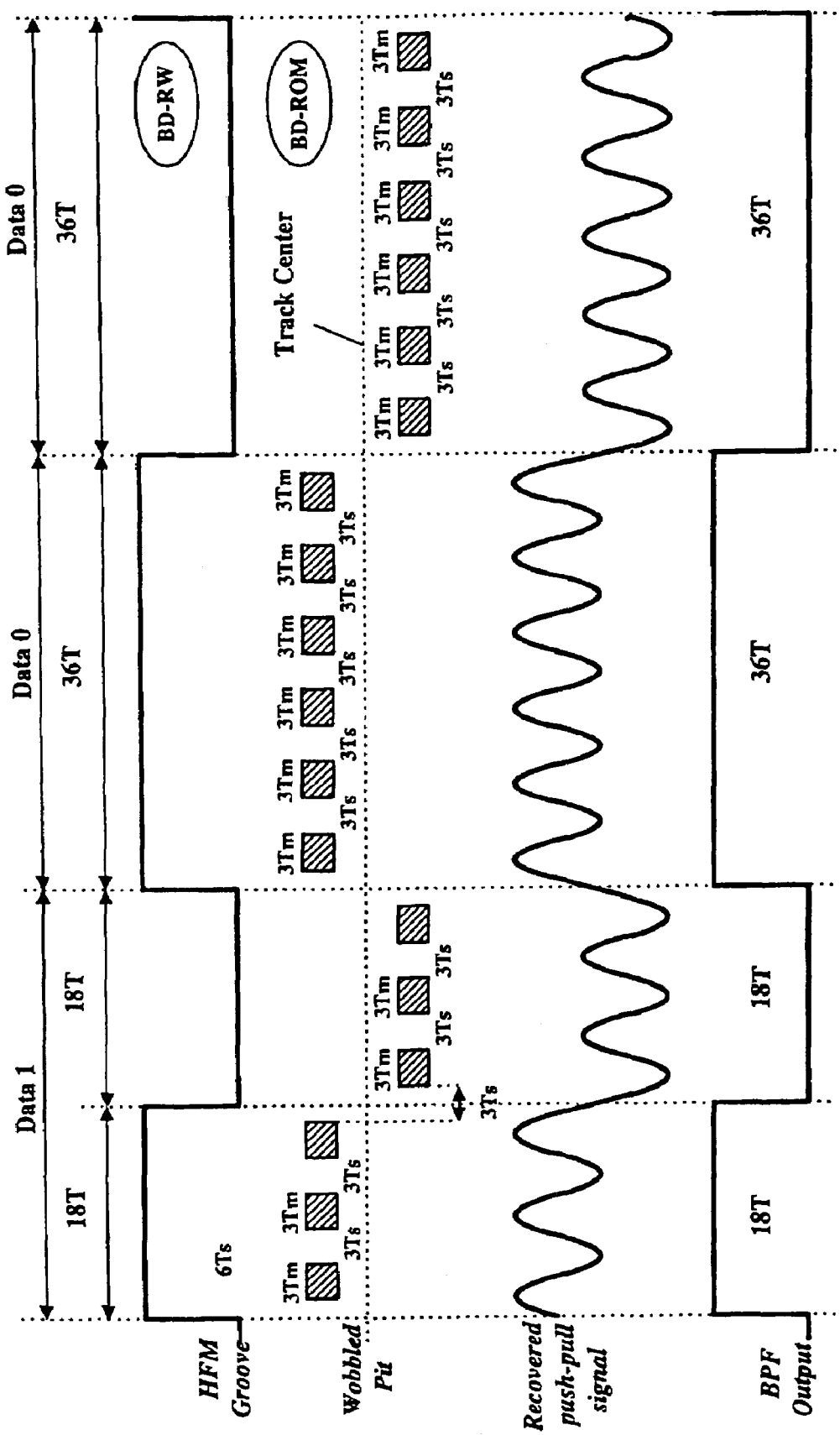
FIGS. 12 to 15 are views illustrating wobbled spaces and marks formed on a PIC (Permanent Information and Control data) sub-area of the BD-ROM in accordance with an embodiment of the present invention.

For example, as shown in FIG. 12, a level transition or level transition point of the HFM groove based on bi-phase modulation is made on the basis of a center of a space. A mark 3Tm and a space 3Ts having a length 3T are repeatedly formed in a recording section of 18T having a high recording level corresponding to the data value of "1". Further, the mark 3Tm and the space 3Ts having a length 3T are repeatedly formed in the recording section of 18T having a low recording level corresponding to the data value of "1".

Similarly, the mark 3Tm and the space 3Ts having a length 3T are repeatedly formed in the recording section of 36T having a high recording level corresponding to the data value of "0". Further, the mark 3Tm and the space 3Ts having the length 3T are repeatedly formed in the recording section of 36T having a low recording level corresponding to the data value of "0".

Figure 13:
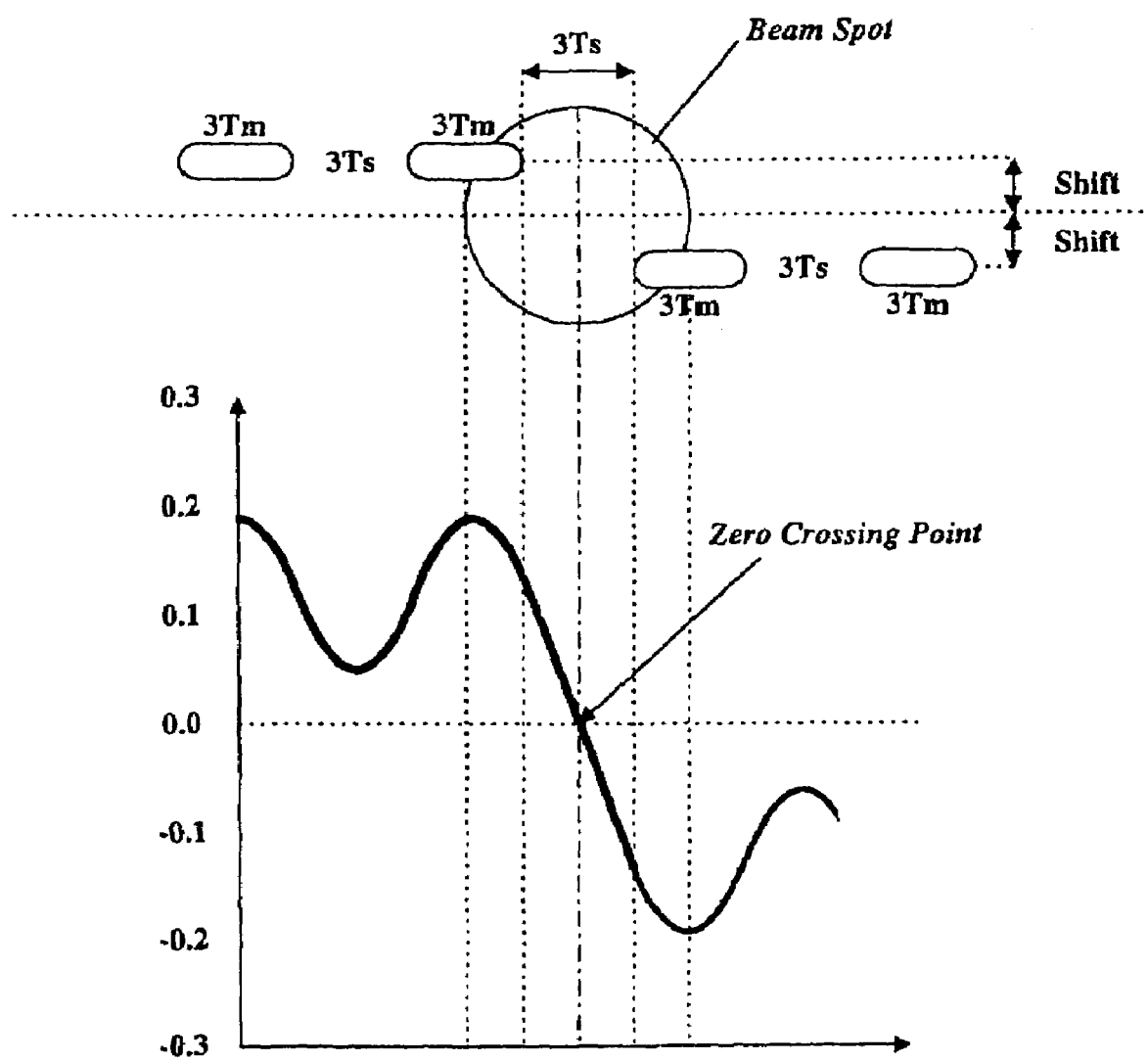

As shown in FIG. 13, since a level transition or a level transition point of the HFM groove based on bi-phase modulation is made on the basis of a center of a space, the level transition point matches the zero crossing point of a push/pull signal. Therefore, a data value can be correctly detected on the basis of the zero crossing point of the push/pull signal.

The space and mark can be formed in a length of at least 2T or 3T, respectively. As shown in FIG. 12, the bilaterally symmetrical marks having the same length are formed on the basis of the level transition point. After a level of the push/pull signal is sliced, the data value of a recovered signal can be correctly detected.

Since the level of the push/pull signal corresponding to the mark and space increases, where the lengths of the mark and space are 5T or more, respectively, an erroneous level transition point can be detected. The length of the mark or space should be limited to the lengths of 2T, 3T or 4T such that the erroneous level transition point is not detected. Lengths of marks and spaces are combined, selected and formed such that the DSV becomes zero or a minimum value to correctly perform a servo control operation.

Figure 14:
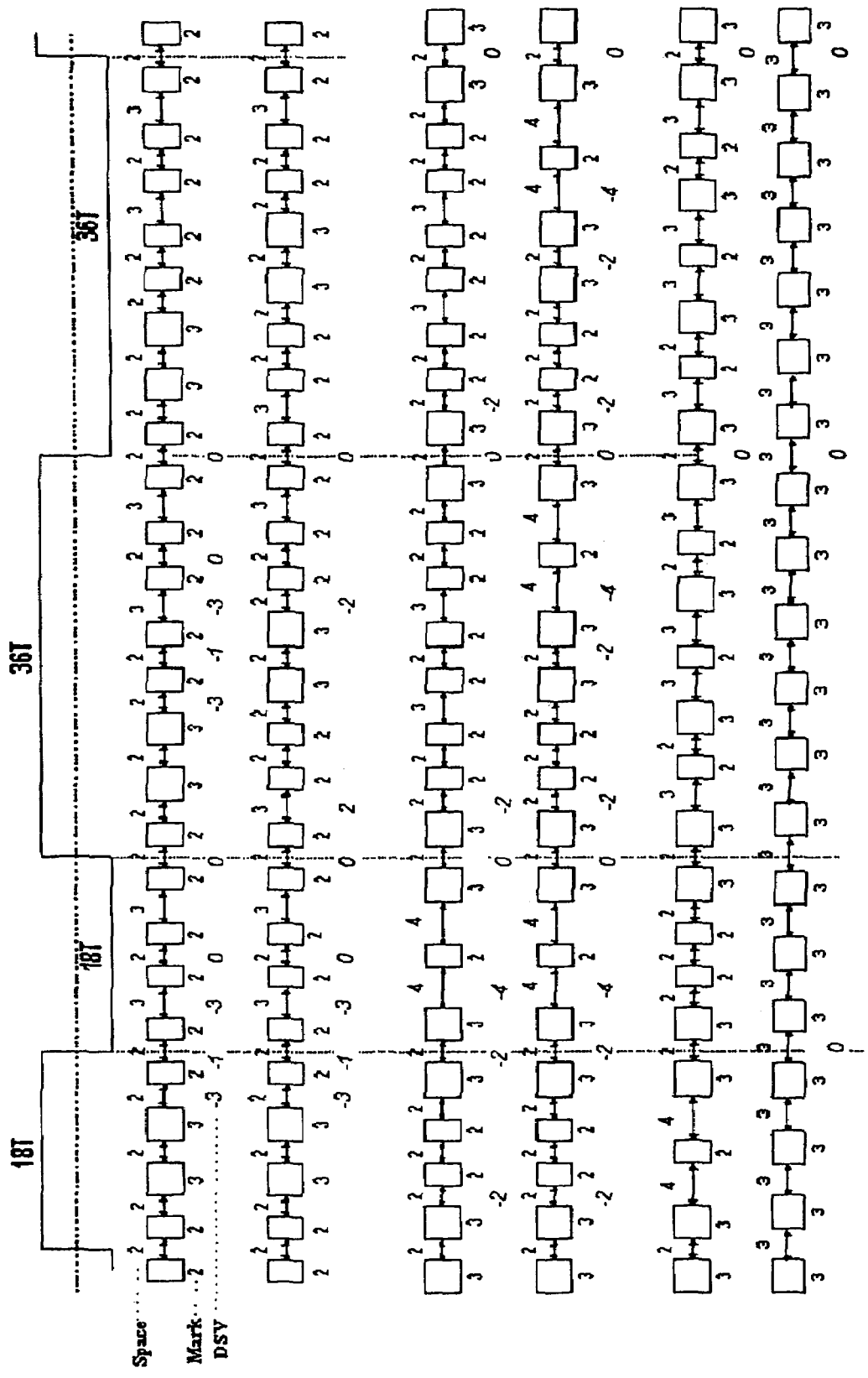

For example, and as shown in FIG. 14, a pit string is formed by a combination of the marks and spaces having the lengths of 2T, 3T and 4T. Simultaneously, the lengths of the marks and spaces are combined and selected such that a DSV associated with the pit string becomes zero or a minimum value.

Marks and spaces having a length of 2T are not consecutively repeated 7 times or more to meet conditions of a 17-PP (Parity Preserve) modulation code and a prohibit RMTR (Run Limited Transition) associated with a BD-RE (rewritable), which limits the maximum number of repeats of marks and spaces having a length of at least 2T to "6" such that an RF (Radio Frequency) signal can be appropriately detected.

Furthermore, the shorter the length of a space according to the level transition is, the sharper a level transition waveform of the push/pull signal is. The length of the space is limited to within the length of 4T, if possible.

Bilaterally symmetrical marks, having the same length, are formed on the basis of the level transition point. The length of the mark is determined according to a diameter of a laser beam spot formed on an optical disc. For example, where a wavelength and NA for a laser beam used in the BD-RE are 400 nm and 0.85, respectively, the diameter of the beam spot formed on the optical disc is approximately 580 nm (=1.22× (400 nm×0.85)), and the diameter of a valid beam spot is approximately 450 nm.

Figure 15:
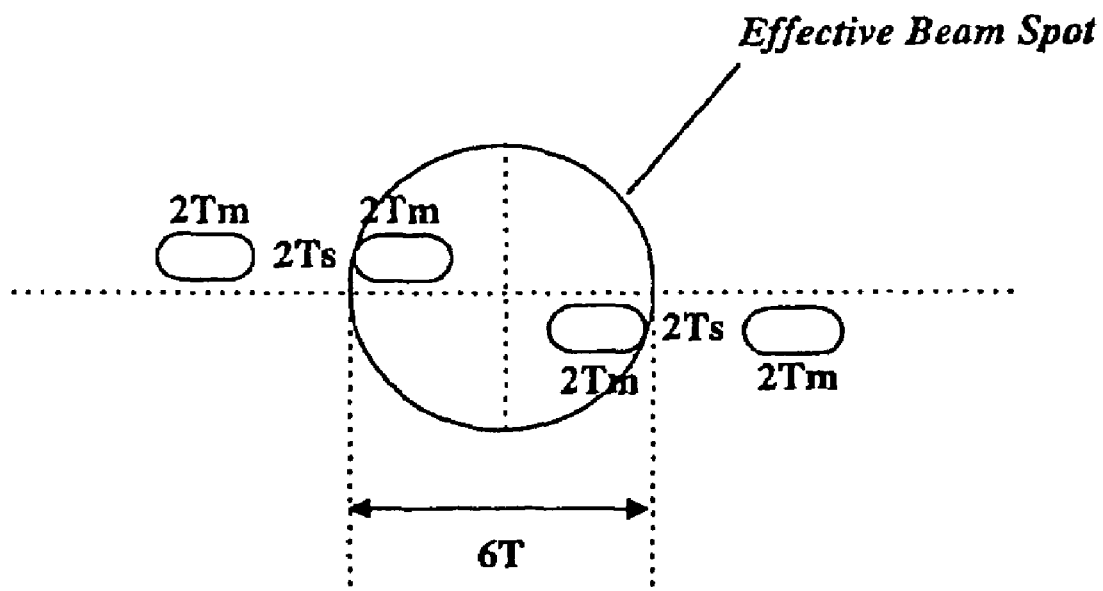
Figure 15:
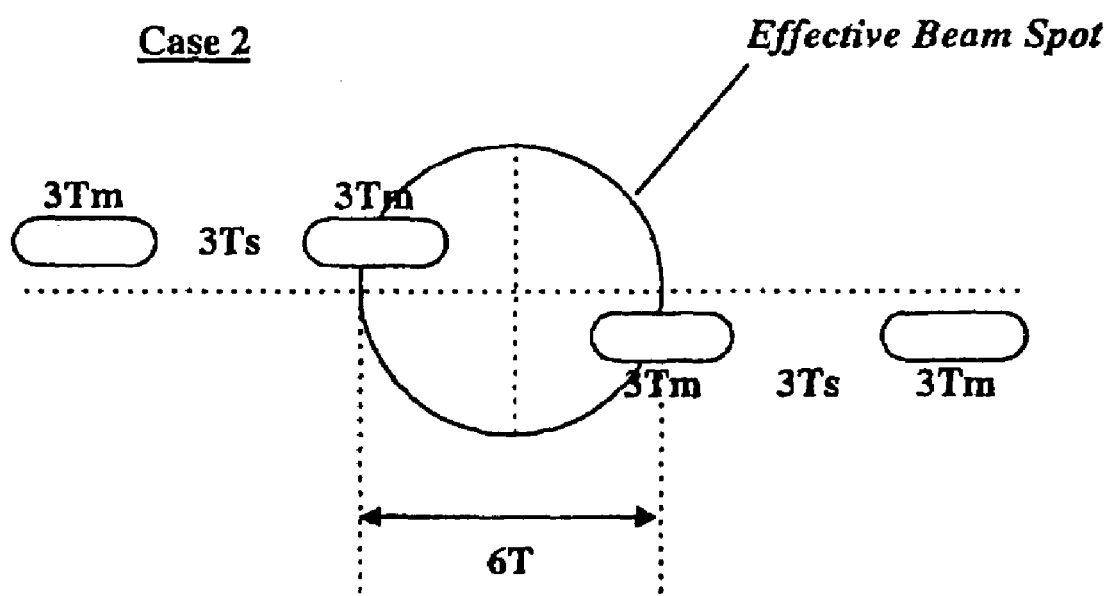

Thus, the length of 1T corresponds to 80 nm, and 450 nm corresponding to the diameter of the valid beam spot corresponds to approximately 6T. As shown in FIG. 15, marks bilaterally symmetrical with respect to a space of the level transition are formed such that the sum of lengths of the marks can be 6T.

The marks bilaterally symmetrical with respect to the space of the level transition can be formed such that the sum of lengths of the marks is more than 6T. However, where the marks are symmetrical with respect to the space having a length less than the diameter of the valid beam spot or where the marks are symmetrical with respect to the space, an offset of the push/pull signal is generated, thereby increasing an amount of jitter.

As apparent from the above description, the present invention provides a high-density read-only optical disc, and an optical disc apparatus and method using the same, which can simplify an algorithm for controlling a plurality of tracking servo operations, avoid an increased size of the optical disc apparatus, and quickly stabilize a playback reference clock by enabling a PLL (Phase Locked Loop) circuit operation using pre-pits to be carried out from a lead-in area to other areas.

The preferred embodiments of the present invention have been disclosed for illustrative purposes. Those skilled in the art can readily implement the tracking servo based on the push/pull method and the tracking servo based on the DPD method by referring to the embodiments of the present invention. Further, those skilled in the art will appreciate that various modifications, additions and substitutions are possible, without departing from the scope and spirit of the invention as disclosed in the accompanying claims.

What is claimed is:

1. An apparatus for reproducing data from a recording medium, comprising:
    a pickup configured to reproduce data recorded on a recording medium, the recording medium including a first area including a lead-in area having a first region where a transition of wobbled pre-pits is present and a second region where the transition of wobbled pre-pits is absent and second area including a data area having straight pre-pits,
    a servo controller configured to control a tracking operation of the pickup in the first area and second area using at least one of PP(Push-Pull) signal and DPD (Differential Phase Detection) signal, wherein the PP signal is generated as a difference of signals detected from photo detector of the pickup, and the DPD signal is generated as a phase difference of signals detected from photo detector of the pickup.

2. The apparatus of claim 1, wherein the recording medium includes a lead-in area, a data area and a lead-out area, wherein at least one of the lead-in and the lead-out area corresponds to the first area, and the data area corresponds to the second area.

3. The apparatus of claim 2, wherein the servo controller controls the tracking operation using the DPD signal in the data area and the at least one of the lead-in and the lead-out area.

4. The apparatus of claim 2, wherein the recording medium is read-only type, and the servo controller controls the pickup to perform same tracking operation using the DPD signal in the data area and the at least one of the lead-in and the lead-out area.

5. The apparatus of claim 2, wherein the at least one of the lead-in area and the lead-out area having the wobbled pre-pits forms a recording pattern similar to HFM (High Frequency Modulated) groove based on a bi-phase modulation, wherein the servo controller controls the pickup to perform the tracking operation using the DPD signal in the at least one of the lead-in and the lead-out area.

6. An apparatus for reproducing data from a recording medium that includes a lead-in area, a data area and a lead-out area, the apparatus comprising:
an optical pickup configured to reproduce data recorded on a recording medium, at least one of the lead-in area and the lead-out area having a first region where a transition of wobbled pre-pits is present and a second region where the transition of wobbled pre-pits is absent and the data area having straight pre-pits; and
a servo controller configured to control a tracking operation of the pickup in the at least one of the lead-in area and the lead-out area using DPD (Differential Phase Detection) signal, wherein the DPD signal is generated as a phase difference of signals detected from photo detector of the pickup.

7. The apparatus of claim 6, wherein the recording medium is read-only type, and the servo controller controls the pickup to perform same tracking operation using the DPD signal in the data area and the at least one of the lead-in and the lead-out area.

8. The apparatus of claim 6, wherein the at least on of the lead-in and the lead-out area having the wobbled pre-pits forms a recording pattern similar to HFM (High Frequency Modulated) groove based on a bi-phase modulation, wherein the servo controller controls the pickup to perform the tracking operation using the DPD signal in at least the at least one of the lead-in and the lead-out area.

9. A method for reproducing data from a recording medium, comprising the steps of:
generating PP(Push-Pull) signal or DPD (Differential Phase Detection) signal from signals received from photo detector of a pickup to read data recorded in first area and second area of the recording medium, the first area having a first region where a transition of wobbled pre-pits is present and a second region where the transition of wobbled pre-pits is absent and the second area having straight pre-pits; and
performing a tracking operation in the first area and second area based on at least one of the PP signal and the DPD signal, wherein the PP signal is generated by a difference of signals detected from the photo detector of the pickup, and the DPD signal is generated by a phase difference of signals detected from the photo detector of the pickup.

10. The method of claim 9, wherein the recording medium includes a lead-in area, a data area and a lead-out area, wherein the at least one of the lead-in and the lead-out area corresponds to the first area, and the data area corresponds to the second area.

11. The method of claim 10, wherein the performing step performs the tracking operation using the DPD signal in the lead-in area, data area, and lead-out area.

12. The method of claim 10, wherein the recording medium is read-only type, and the performing step performs a same tracking operation using the DPD signal in the data area and the at least one of the lead-in and the lead-out area.

13. The method of claim 9, wherein the at least one of the lead-in and the lead-out area having the wobbled pre-pits forms a recording pattern similar to HFM (High Frequency Modulated) groove based on a bi-phase modulation, wherein the performing step performs the tracking operation using the DPD signal in at least one of the lead-in and the lead-out area.

14. An apparatus for reproducing data from a recording medium, comprising:
photoelectric conversion unit configured to receive light reflected from the recording medium and output a plurality of electric signals, wherein the recording medium including a lead-in area, a data area and a lead-out area, the lead-in and/or lead-out area having a first region where a transition of wobbled pre-pits is present and a second region where the transition of wobbled pre-pits is absent the wobbled pre-pits having a pattern modulated by a phase modulation, the data area having straight pre-pits;
first generator configured to generate PP(Push-Pull) tracking signal by adding and subtracting the outputted electric signals;
second generator configured to generate DPD(Differential Phase Detection) tracking signal by comparing phases of the outputted electric signals; and
controller configured to control a tracking operation using at least one of the tracking signals generated from the first and second generator on the first area of lead-in and/or lead-out area and data area having straight pre-pits.

15. The apparatus of claim 14, wherein the recording medium is Read-Only type.

16. The apparatus of claim 15, wherein the recording medium is BD (Blu-ray Disc)-ROM.

17. An apparatus for reproducing or recording data from or on a recording medium, comprising:
photoelectric conversion unit configured to receive light reflected from a recording medium and outputting a plurality of electric signals;
first generator configured to generate PP(Push-Pull) tracking signal by adding and subtracting the outputted electric signals;
second generator configured to generate DPD(Differential Phase Detection) tracking signal by comparing phases of the outputted electric signals; and
controller configured to control a tracking operation using at least one of the tracking signals generated from the first and second generator according to a type of the recording medium, wherein the type of recording medium includes Read-Only type and Writable type, the Read-Only type including lead-in area, data area, and lead-out area, the lead-in and/or lead-out area having a first region where a transition of wobbled pre-pits is present and a second region where the transition of wobbled pre-pits is absent the wobbled pre-pits having a pattern modulated by a phase modulation, the data area having straight pre-pits, and the Writable type including lead-in area, data area, and lead-out area, the lead-in and/or lead-out area having first area formed in HFM (High Frequency Modulated) groove based on a bi-phase modulation, the data area formed by wobbled groove.

18. The apparatus of claim 17, wherein the controller controls the tracking operation using DPD tracking signal if the type of recording medium is Read-Only type, and controls the tracking operation using PP(Push-Pull) tracking signal if the type of recording medium is Writable type.

19. The apparatus of claim 17, wherein the Read-only type is BD(Blu-ray disc)-ROM and the Writable type is BD(Blu-ray disc)-Rewritable.

20. The apparatus of claim 19, wherein the controller controls the tracking operation using DPD tracking signal if the type of recording medium is BD(Blu-ray disc)-ROM, and controls the tracking operation using PP(Push-Pull) tracking signal if the type of recording medium is BD(Blu-ray disc)-Rewritable.

21. A method for reproducing or recording data from or on a recording medium, comprising the steps of:
  identifying a type of optical recording medium, wherein the type of recording medium includes Read-Only type and Writable type, the Read-Only type including lead-in area, data area, and lead-out area, the lead-in and/or lead-out area having a first region where a transition of wobbled pre-pits is present and a second region where the transition of wobbled pre-pits is absent the wobbled pre-pits having a pattern modulated by a phase modulation, the data area having straight pre-pits, and the Writable type including lead-in area, data area, and lead-out area, the lead-in and/or lead-out area having first area formed in HFM (High Frequency Modulated) groove based on a bi-phase modulation, the data area formed by wobbled groove; and
  controlling a tracking operation using tracking error signal based on the identified type of the optical recording medium, wherein the tracking error signal being one of PP(Push-Pull) tracking signal generated by adding and subtracting electric signals detected from a pickup and DPD(Differential Phase Detection) tracking signal generated by comparing phases of electric signals detected from the pickup.

22. The method of claim 21, wherein the controlling step controls the tracking operation using DPD tracking signal if the type of recording medium is Read-Only type, and controls the tracking operation using PP(Push-Pull) tracking signal if the type of recording medium is Writable type.

23. The method of claim 21, wherein the Read-only type is BD(Blu-ray disc)-ROM and the Writable type is BD(Blu-ray disc)-Rewritable.

24. The method of claim 23, wherein the controlling step controls the tracking operation using DPD tracking signal if the type of recording medium is BD(Blu-ray disc)-ROM, and controls the tracking operation using PP(Push-Pull) tracking signal if the type of recording medium is BD(Blu-ray disc)-Rewritable.

25. The method of claim 21, wherein the controlling step controls the tracking operation corresponding to the one tracking error signal to be continuously applied to an entire area of a same recording medium.

\* \* \* \* \*